(12) United States Patent
Hamdard (10) Patent No.: US 11,486,441 B2
(45) Date of Patent: Nov. 1, 2022

(54) SLIDING BEARING ELEMENT

(71) Applicant: Miba Gleitlager Austria GmbH, Laakirchen (AT)

(72) Inventor: Kamal Hamdard, Gmunden (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 0 days.

(21) Appl. No.: 17/272,302

(22) PCT Filed: Aug. 26, 2019

(86) PCT No.: PCT/AT2019/060271
§ 371 (c)(1),
(2) Date: Feb. 27, 2021

(87) PCT Pub. No.: WO2020/041808
PCT Pub. Date: Mar. 5, 2020

(65) Prior Publication Data
US 2021/0396270 A1 Dec. 23, 2021

(30) Foreign Application Priority Data
Aug. 29, 2018 (AT) .............. A 50740/2018

(51) Int. Cl.
*F16C 17/02* (2006.01)
*F16C 17/24* (2006.01)
*F16C 33/12* (2006.01)
*F16C 41/00* (2006.01)

(52) U.S. Cl.
CPC .......... *F16C 17/022* (2013.01); *F16C 17/246* (2013.01); *F16C 33/125* (2013.01); *F16C 41/007* (2013.01); *F16C 2223/60* (2013.01); *F16C 2233/00* (2013.01)

(58) Field of Classification Search
CPC ...... F16C 17/022; F16C 17/24; F16C 17/243; F16C 17/246; F16C 33/122; F16C 33/125; F16C 33/127; F16C 33/14; F16C 41/00
See application file for complete search history.

(56) References Cited

U.S. PATENT DOCUMENTS

| 3,033,031 A | * | 5/1962 | Gruber | F16C 17/24 |
| | | | | 73/862.041 |
| 9,791,348 B2 | * | 10/2017 | Carnahan | F16C 43/00 |
| 9,874,494 B2 | * | 1/2018 | Izrailit | F16C 19/522 |
| 10,253,817 B2 | | 4/2019 | Plogmann et al. | |
| 10,288,113 B2 | * | 5/2019 | Gorges | G01L 9/0072 |
| 2012/0251023 A1 | * | 10/2012 | Gaertner | C23C 14/046 |
| | | | | 204/192.15 |

(Continued)

FOREIGN PATENT DOCUMENTS

| AT | 408900 B | 3/2002 |
| DE | 102007049041 A1 | 4/2009 |

(Continued)

*Primary Examiner* — James Pilkington
(74) *Attorney, Agent, or Firm* — Stoel Rives LLP (57) ABSTRACT

A sliding bearing element with a first layer having a radially inner surface includes a measuring device arranged on the radially inner surface of the first layer. The measuring device includes, in the order indicated, a first electrical insulating layer, a sensor layer and a second electrical insulating layer. A sliding layer is arranged on the second electrical insulating layer.

19 Claims, 5 Drawing Sheets

(56) References Cited

U.S. PATENT DOCUMENTS

| | | | |
|---|---|---|---|
| 2015/0049970 A1 | 2/2015 | Carnahan et al. | |
| 2016/0109306 A1 | 4/2016 | Janssen et al. | |
| 2016/0208849 A1 | 7/2016 | Gorges et al. | |
| 2017/0051721 A1* | 2/2017 | Murakami | F03D 13/20 |

FOREIGN PATENT DOCUMENTS

| | | | |
|---|---|---|---|
| EP | 0844469 A1 | 5/1998 | |
| EP | 1058106 A1 | 12/2000 | |
| JP | 2001220605 A | 8/2001 | |
| JP | 2009254163 A | 10/2009 | |
| JP | 2010281355 A | 12/2010 | |
| JP | 2014074641 | * | 4/2014 |
| JP | 2014074641 A | 4/2014 | |

* cited by examiner

SLIDING BEARING ELEMENT

RELATED APPLICATIONS

This application is a national stage under 35 U.S.C. § 371 of International Application No. PCT/AT2019/060271, filed Aug. 26, 2019, which claims priority of Austrian Patent Application No. A50740/2018, filed Aug. 29, 2018.

OVERVIEW

The present disclosure relates to a sliding bearing element comprising a first layer having a radially inner surface, wherein a measuring device being arranged on the radially inner surface of the first layer comprises, in the order indicated, a first electrical insulating layer, a sensor layer, and a second electrical insulating layer.

The present disclosure further relates to a sliding bearing comprising a bearing receptacle, i.e. bearing mount, having a radially inner surface and at least one sliding bearing element arranged to abut the radially inner surface of the bearing receptacle.

In addition, the present disclosure relates to a method of manufacturing a sliding bearing element, according to which a measuring device is formed on a radially inner surface of a first layer, for which purpose a first electrical insulating layer, a sensor layer and a second electrical insulating layer are deposited in the order indicated.

In recent years, sensor-based monitoring of sliding bearings has become increasingly important. In addition to the indirect measurement of sliding bearing parameters, the arrangement of sensors in or in the immediate vicinity of the lubrication gap is increasingly at the forefront of development. In this context, not only the environmental conditions for the sensors are problematic, but also the mechanical characteristics peculiar to sliding bearings, such as the presence of rotating components. By way of example, reference is made to AT 408 900 B, from which a device for monitoring a sliding bearing, which has a bearing shell clamped in a support body, is known, with at least one measuring sensor for temperature-dependent measurement signals arranged in the bearing shell area and with an evaluation circuit for the measurement signals. The measuring sensor is designed as a pressure sensor for pressure forces acting in the circumferential direction of the bearing shell or for radial pressure forces between the bearing shell and the supporting body.

US 2016/0208849 A1 discloses a sliding bearing and a method of manufacturing the same. The sliding bearing has a metallic substrate, a first electrically insulating layer on the metallic substrate, an electrical component on the electrically insulating layer, and a second electrically insulating layer. The two electrically insulating layers are formed as an anti-friction varnish layer.

The present inventors recognized an opportunity for improving a sliding bearing element with a sensor for detecting operating parameters, with regard to the application properties.

In the case of the abovementioned sliding bearing element, a sliding layer may be arranged on the second electrical insulating layer.

One advantage of certain embodiments disclosed herein is that the additional arrangement of a sliding layer may better protect the measuring device from the influence of the rotating shaft. In addition, a sliding bearing element may be provided that is comparable to currently known sliding bearing elements in terms of tribological properties, although the sliding bearing element is equipped with a measuring sensor system. Due to the selected structure of the sliding bearing element, metallic layers may also be used for the sliding layer.

According to a preferred embodiment of the present disclosure, it may be provided that the sliding layer is a layer deposited by means of a PVD method, in particular it is a sputtering layer. These layers have the advantage that they may be applied directly to the measuring device, i.e. to the second electrical insulation layer, without having to take further protective measures. In addition, these sliding layers have very good tribological properties, particularly with regard to fatigue strength, which means that the sliding bearing element may have better overall properties and the measuring device may also be better protected against negative mechanical influences.

However, according to another embodiment of the present disclosure, it may also be provided that the sliding layer is an anti-friction varnish layer. Like a PVD layer, this may be easily applied, i.e. without having to take further protective measures for the measuring device. It is also advantageous that unevenness in the surface of the measuring device to which the sliding layer is applied may be compensated more easily.

According to a further embodiment of the present disclosure, it may be provided that a running-in layer, in particular a running-in layer of an anti-friction varnish, is arranged on the sliding layer. The running-in layer allows a more rapid adaptation of the surfaces of the sliding partners, as a result of which the sliding bearing element is more rapidly subjected only to a normal operational load. Irregular or surprising overloads of the measuring device may thus be better avoided, so that it is also more quickly subjected only to normal operating loads.

According to another embodiment of the present disclosure, at least one of the first and second insulating layers may be formed by $Al_2O_3$ and $SiO_2$. Compared to other electrically insulating materials, these oxides have, in addition to good oxidation resistance, good temperature stability and a relatively high abrasion resistance, which means that the measuring device may be subjected to higher loads.

It is also advantageous if at least one of the first and second insulating layers has a thickness of between 2 μm and 8 μm. This relatively thin design of the (brittle) insulating layer(s) makes it easier to avoid delamination of the layers.

According to a further embodiment of the present disclosure, it may be provided that the sensor layer is formed by chromium or a chromium-nickel alloy. The adhesion between the insulating layers and the sensor layer may thus be improved, whereby the measuring device may be subjected to a higher overall load without the risk of delamination. In addition, the influence on the measuring temperature by the sensor material may thus also be kept low.

For the reasons mentioned regarding the thickness of at least one of the insulating layers, according to another embodiment of the present disclosure it may be provided that the sensor layer has a layer thickness between 0.1 μm and 4 μm.

According to a further embodiment of the present disclosure, it is preferably provided that the sensor layer is arranged at least in the most heavily loaded zone of the sliding layer in order to be able to detect damage to the sliding bearing element as early as possible. At the same time, the measuring device is thus exposed to a relatively high pressure, which also counteracts delamination of the layers of the measuring device.

For easier contacting of the sensor layer with further electrical components, it may be provided in accordance with one embodiment of the present disclosure that electrical contacts are arranged on a radially outermost layer, which are electrically conductively connected to the sensor layer. According to one embodiment of the present disclosure, the sliding bearing itself may have electrical contacts on the radially inner surface of the bearing receptacle, so that the contacting of the measuring device of the sliding bearing element is already automatically established by inserting the sliding bearing element into the bearing receptacle.

According to a further embodiment of the present disclosure, it may be provided that the sensor layer is connected to a data transmission device, the data transmission device being designed for wireless data transmission. By avoiding wired data transmission, this may be carried out more easily to further systems, for example in an engine house or in a motor vehicle.

To increase the self-sufficiency of the measuring device, it may be provided that the sensor layer is connected to an energy generating device. This may also better prevent a failure of the measuring device due to a lack of energy.

According to a further embodiment of the present disclosure, the sensor layer may be connected to a measuring bridge (four-wire measurement) in order to be able to better control interferences of the measurement signal due to terminal resistances or line resistances.

Further, according to another embodiment of the present disclosure, it may be provided that the sensor layer comprises a conductor loop for temperature compensation during measurement, which may improve the measurement accuracy.

In order to improve the compactness of the arrangement for determining operating parameters of the sliding bearing element, according to one embodiment of the present disclosure, it may be provided that a recess is formed on a radial end face of the sliding bearing element in which a telemetry device is arranged.

However, it may also be provided that the telemetry device is arranged on or at least partially in the bearing receptacle, according to another embodiment of the present disclosure.

According to one embodiment of the method, the sensor layer is preferably deposited over the entire surface and then structured, as this makes it easier and faster to manufacture the measuring device. The sliding bearing element may thus be designed more economically and thus with better customer acceptance. For the structuring, according to one embodiment, a laser and at least one mask may be used for this purpose, whereby on the one hand the production may be carried out on a large scale by means of series production. In addition, the use of a laser makes it easy to manufacture the sliding bearing elements individually or in small batches.

According to another embodiment of the present disclosure, at least one of the layers of the measuring device is produced by means of reactive sputtering, whereby the layer composition may be easily changed and influenced.

BRIEF DESCRIPTION OF THE DRAWINGS

For a better understanding of the invention, it is explained in more detail with reference to the following figures.

Therein, they show respectively in simplified schematic diagrams.

DETAILED DESCRIPTION OF PREFERRED EMBODIMENTS

By way of introduction, it should be noted that in the differently described embodiments, the same parts are provided with the same reference signs or the same component designations, whereby the disclosures contained in the entire description may be transferred mutatis mutandis to the same parts with the same reference signs or the same component designations. Also, the positional indications selected in the description, such as top, bottom, side, etc., are related to the directly described as well as depicted figure, and these positional indications are to be transferred mutatis mutandis to the new position in the event of a change of position.

Figure 1:
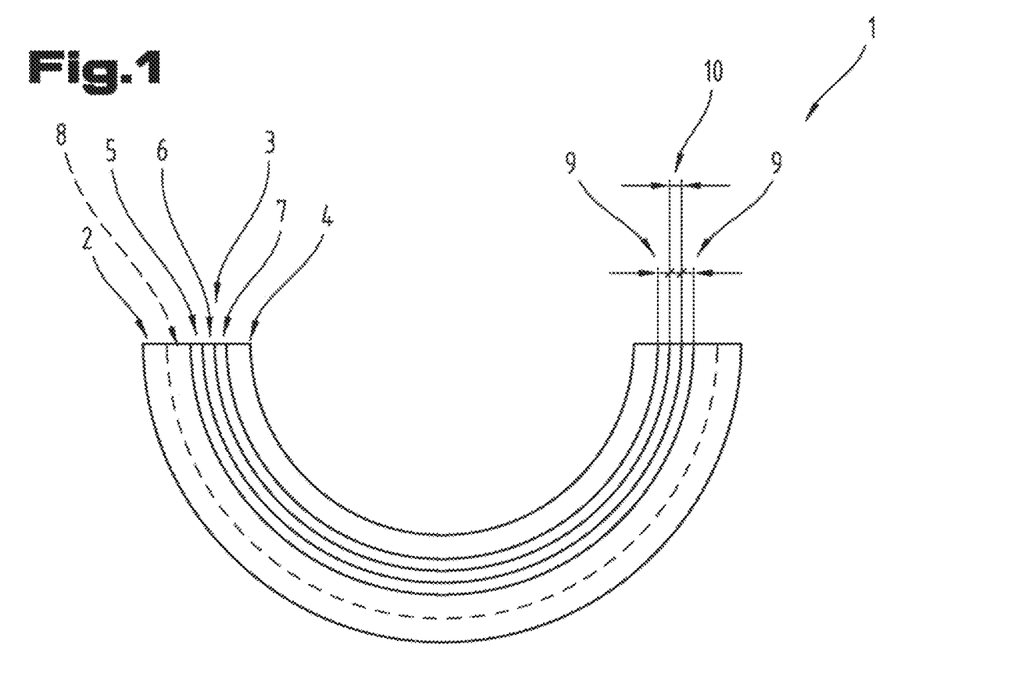
FIG. 1 a side view of a sliding bearing element.

FIG. 1 shows a sliding bearing element 1 in the form of a multilayer sliding bearing. The sliding bearing element 1 is designed as a half shell, i.e. it covers an angular range of 180°.

Shown is a five-layer variant consisting of a first layer 2, which in this embodiment forms the support layer of the sliding bearing element 1, a measuring device 3 arranged directly on the first layer 2, i.e. on a radially inner surface of the layer 2, and a sliding layer 4 arranged directly on the measuring device 3. The measuring device 3 comprises at least three layers, namely a first electrical insulating layer 5 directly abutting the first layer 2 of the sliding bearing element 1, a sensor layer 6 directly abutting the first electrical insulating layer 5, and a second electrical insulating layer 7 directly abutting the sensor layer 6.

Although the three-layer design of the measuring device 3 is the preferred one, it may also have more than three layers. For example, at least one of the two electrical insulating layers 5, 7 may consist of several partial layers arranged one above the other, which may also be composed differently. Further, the sensor layer 6 may also consist of several partial layers arranged one above the other, which may also be composed differently.

However, the sliding bearing element 1 may also have other layers. For example, the sliding bearing element 1 may also have a bearing metal layer 8, which is arranged between the measuring device 3 and the support layer of the sliding bearing element. In this case, the bearing metal layer 8 forms the first layer 2 mentioned above, so that the explanations regarding the first layer 2 in this description for this embodiment of the sliding bearing element 1 are to be applied to the bearing metal layer 8.

In addition, the sliding bearing element 1 may have other layers, such as a bonding agent layer and/or a diffusion barrier layer between the bearing metal layer 8 and the support layer, or a running-in layer on the sliding layer 4. Likewise, an antifretting layer may be arranged on the back of the support layer.

Although the sliding bearing element 1 is shown as a half shell, it may also be designed differently, for example as a bearing bush. In general, sliding bearing elements 1 are possible which cover an angular range deviating from 180°.

The support layer is made of a material which gives the sliding bearing element 1 the required structural strength, for example a brass or bronze. In the preferred embodiment of the sliding bearing element 1, however, it consists of steel. Insofar as the sliding bearing element 1 is designed as a direct coating, for example of the radially inner surface of a bearing receptacle or of the outer surface of a shaft, the support layer is formed by the material of the direct-coated component. Moreover, in this case, the support layer is not a conventional layer in the strict sense of the word. However, in the context of the present disclosure, the term "support layer" also includes such embodiments.

A wide variety of alloys may be used as a bearing metal layer 8. Examples include aluminum-based bearing metals, e.g. AlSn6CuNi, AlSn20Cu, AlSi4Cd, AlCd3CuNi, AlSi11Cu, AlSn6Cu, AlSn40, AlSn25CuMn, AlSi11CuMgNi, AlZn4Si. For example, the bearing metal layer 8 may be formed by CuPb4Sn4Zn4, CuPb5Sn5Zn5, CuPb7Sn7Zn4, CuPb9Sn5, CuPb10Sn10, CuPb15Sn7, CuPb22Sn2, CuPb20Sn4, CuPb22Sn8, CuPb24Sn2, CuPb24Sn, CuPb24Sn4, CuSn5Zn, CuAl10Ni, CuSn10. A tolerance range of up to 5 percentage points applies to the composition data for all the alloy variants listed.

The bearing metal layer 8 may be deposited or arranged on the support layer using a conventional method known from sliding bearing technology. For example, a bimetal may be manufactured from the support layer and the bearing metal layer 8 by rolling on the bearing metal layer 88. Likewise, the bearing metal layer 8 may be cast onto the support layer. If necessary, this bimetal is formed and/or machined.

The sliding layer 4 may consist of conventional materials known for this purpose in sliding bearing technology. For example, the sliding layer 4 may consist of an electrodeposited material.

In the preferred embodiment, however, the sliding layer 4 is a layer deposited by means of a PVD method. Particularly preferably, the sliding layer is a sputtering layer, in particular produced by a cathode sputtering method. For this purpose, the deposition of the sliding layer 4 may take place in a method gas, for example consisting of or comprising argon.

The sliding layer 4 may be made of or include a tin-based alloy or an alloy with aluminum as the base element, such as AlSn20Cu1, Al—Bi15Cu1Ni1, or by an alloy with copper as the base element, such as CuPb27, CuPb25Sn3, CuPb25Ni3, or by silver or an alloy with silver as the base element, such as AgCu5.

The following parameters may be applied for deposition by a sputtering method:

Voltage at the sliding bearing element blank on which the sliding layer 4 is deposited: −150 V to 0 V Process gas: Argon Process gas pressure: 3×10-4 to 6×10-3 mbar, Temperature: 80 to 160° C.

Voltage at the target(s): −450 V to −800 V

Coating rate: 0.1 μm/minute to 5 μm/minute

It is well known that during sputtering, method gas atoms are accelerated onto a target and knock out the metal atoms to be deposited, which are subsequently accelerated in the direction of the sliding bearing element blank and deposit on its surface, so that the sliding layer 4 is built up. Since this method is known in principle, please refer to the relevant prior art for further details.

Deposition by a PVD (physical vapor deposition) method is preferred because these take place apart from thermodynamic equilibrium, so particle diffusion and coagulation of precipitates may be prevented.

However, the sliding layer 4 may also have been produced by an electron beam evaporation methods.

According to another embodiment of the sliding bearing element 1, it may be provided that the sliding layer 4 is an anti-friction varnish layer, i.e. a polymer layer made of an anti-friction varnish, for example by spraying or brushing or dipping on the anti-friction varnish and then drying the anti-friction varnish to form the polymer layer.

In principle, any suitable anti-friction varnish with sufficient abrasion resistance and sliding properties may be used as an anti-friction varnish. For example, a PTFE-based anti-friction varnish may be used.

Preferably, however, a polyamide-based anti-friction varnish is used, in particular one based on a polyamide-imide, which contains at least one solid lubricant, such as $MoS_2$, graphite, hexagonal BN, etc. It is further preferred if the anti-friction varnish contains both $MoS_2$ and graphite as solid lubricants.

The polymer layer formed from the anti-friction varnish after its application to the measuring device 3 may have a composition of 20 wt. % to 45 wt. % of polyamide-imide, 30 wt. % to 55 wt. % of MoS2, and 10 wt. % to 25 wt. % of graphite, with the proviso that the sum of all the constituents of the polymer layer adds up to 100 wt. %.

To increase the mechanical strength, the polymer layer may contain further additives in a total proportion of at most 10 wt. %, such as fibers, hard materials, e.g. carbides, oxides, nitrides, for example $CrO_2$, $Fe_3O_4$, ZnO, $Al_2O_3$, $SiO_2$, SiC, $Si_3N_4$, etc.

The polymer layer may have a layer thickness selected from a range of 1 μm to 40 μm, in particular from 3 μm to 30 μm.

The polymer layer advantageously has a Vickers hardness selected from a range of 20 HV (0.01) to 45 HV (0.01).

As already explained above, a running-in layer may also be arranged on the sliding layer 4, i.e. on its radially inner surface. In this embodiment variant, the sliding layer 4 is preferably a PVD layer, in particular a sputtering layer, and the running-in layer is a polymer layer made from an anti-friction varnish. With regard to the materials for this purpose, reference is made to the preceding explanations.

According to a preferred embodiment, the first and/or the second electrical insulating layer 5, 7 comprise $Al_2O_3$ and/or $SiO_2$ or consist thereof. In the preferred embodiment, both the first electrical insulating layer 5 and the second insulating layer 7 comprise $Al_2O_3$ and/or $SiO_2$ or consist thereof.

However, the first and/or the second insulating layer 5, 7 may also be made of other electrically insulating materials, such as $ZrO_2$.

Preferably, the first and/or the second insulating layer 5, 7 (particularly preferably both insulating layers 5, 7) have a layer thickness 9 selected from a range of 2 μm to 8 μm, in particular from a range of 3 μm to 5 μm, for the reasons stated above.

According to a further preferred embodiment, the sensor layer 6 comprises chromium or a chromium-nickel alloy or consists thereof. The chromium-nickel alloy may in particular have a chromium content of between 15 wt. % and 25 wt. %. The remainder to 100 wt. % is the nickel. For example, the chromium-nickel alloy may have 20 wt. % chromium and 80 wt. % nickel.

However, the sensor layer 6 may also be made of or include other electrically conductive materials, such as Ag, Pt, Cu-based materials such as CuNiMn.

Preferably, for the above reasons, the sensor layer 6 has a layer thickness 10 selected from a range of 0.1 μm to 4 μm, in particular from a range of 0.2 μm to 2 μm.

With the measuring device 3, in particular with the sensor layer 6, it is possible to detect at least one operating parameter during operation of the sliding bearing element 1, such as in particular the temperature and/or the pressure in the lubricant gap of a sliding bearing equipped with the sliding bearing element 1. For this purpose, the change in electrical conductivity may be detected.

Figure 2:
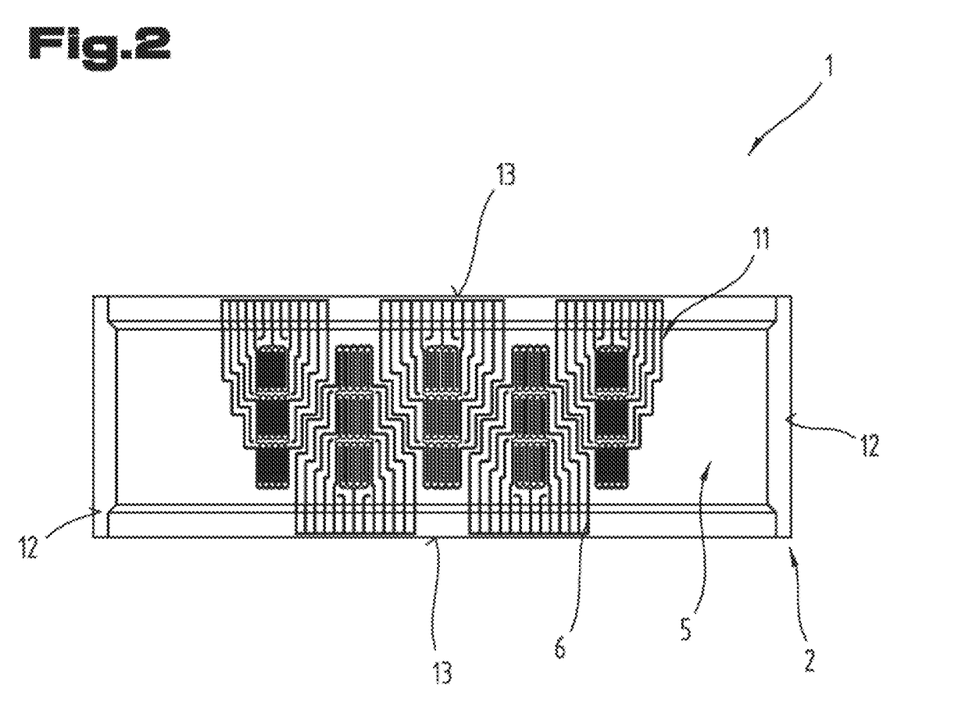
FIG. 2 a sliding bearing element in top view of the sensor layer.

For the acquisition of the measured value, the sensor layer 6 may be structured accordingly, as shown by way of example in FIG. 2. For better representability of this structuring, the second electrical insulating layer 7 and the sliding layer 4 (both shown in FIG. 1) are not shown in FIG. 2.

It should be noted, however, that the arrangement of conductive paths 11 illustrated in FIG. 2 is only exemplary and not of a limiting character. Depending on the parameters to be measured, other topographies of the sensor layer 6 are also possible.

For the production of the conductive paths 11, in the preferred embodiment of the method, after deposition on the radially inner surface of the first layer 2, the first electrical insulating layer 5 is deposited first. This is preferably deposited on the entire radially inner surface of the first layer 2, but may also be deposited only at the location or locations at which the sensor layer 6 is arranged in the finished sliding bearing element 1.

The sensor layer 6 is then deposited on this first electrical insulating layer 5. Again, this is preferably deposited over the entire radially inner surface of the first electrical insulating layer 5. However, it may also be deposited (also preferably over the entire surface) only at the location or locations at which the sensor layer 6 is arranged in the finished sliding bearing element 1.

After the sensor layer 6 has been deposited, it will be structured to form the conductive paths 11. In the method, the areas of the sensor layer 6 in which no conductive paths 11 are arranged are removed again. The sensor layer 6, which was originally preferably full-surface, thus becomes a sensor layer 6 arranged only in discrete areas of the first electrical insulating layer 5.

It should be noted that it is sufficient to remove only the areas of the sensor layer 6 in the region adjacent to the conductive paths 11. Areas of the sensor layer 6 in which no conductive paths are arranged, i.e. for example in the embodiment example of FIG. 2 in the area of end faces 12 pointing in the circumferential direction, the originally deposited sensor layer 6 may remain untreated if necessary.

The second electrical insulating layer 7 is then deposited on the structured sensor layer 6 on its radially inner surface and the sliding layer 4 on its radially inner surface. This results in a sliding bearing element 1 with at least one integrated thin-film sensor.

The deposition of the first electrical insulating layer 5 and/or the second electrical insulating layer 7 and/or the sensor layer 6 is preferably carried out by means of a PVD method (physical vapor deposition), in particular with a sputtering method, preferably by means of magnetron sputtering technology. Further, in the preferred embodiment of the method, a planar magnetron is used, i.e. a magnetron with a planar target.

Particularly preferably, both the first and second electrical insulating layer 5, 7 and the sensor layer 6 are produced using this method.

The following parameters may be applied for the deposition of the layers:

Sensor layer 6:
Voltage at the sliding bearing element blank: −150 V to 0 V
Process gas mixture: argon, oxygen
Process gas pressure: 33 10-4 mbar to 6×10-3 mbar,
Temperature: 100° C. to 160° C.
Voltage at the target(s): −450 V to −800 V
Coating rate: 0.1 µm/minute to 2 µm/minute
Insulating layer 5, 7:
Voltage at the sliding bearing element blank: −120 V to 0 V
Process gas mixture: argon, oxygen
Process gas pressure: 3×10-4 mbar to 6×10-3 mbar,
Volume mixing ratio argon to oxygen >=1.5:1
Temperature: 100° C. to 160° C.
Voltage at the target(s): −350 V to −700 V
Coating rate: 0.1 µm/minute to 1.5 µm/minute It may be provided that the transition between the individual layers is abrupt or that they gradually merge into one another. For example, the transition from the second insulating layer 7 to the sliding layer 4 may be formed starting from $Al_2O_3$ via $Al_xO_y$ (x:y>2:3) via Al via AlSnx (x<20) to AlSn20Cu. Alternatively or additionally, starting from the first insulating layer 5 to the sensor layer 6, the layer sequence may be as follows: $Al_2O_3 \rightarrow Al_xO_y$ (x:y>2:3) →Al→ sensor layer material. The layer thickness of the transition from the second insulating layer 7 to the sliding layer 4 may be between 0.05 µm and 1.5 µm. The layer thickness of the transition from the first insulating layer 5 to the sensor layer 6 may be between 0.001 µm and 0.1 µm.

According to a further embodiment of the method, it is possible for at least one of the first and second electrical insulating layers 5, 7 and the sensor layer 6 (preferably the first and second insulating layers 5, 7) to be produced by means of reactive sputtering. In this method, the at least one layer is produced from atoms from the target and from atoms from the gas atmosphere in the deposition chamber in which the coating is carried out. A reactive gas is used for this purpose. Alternatively, however, this reactive gas may also be generated from an appropriately composed target that may release oxygen, for example. The reactive gas or its ionized components react chemically with the target material or the atoms generated from it. The resulting compounds are then deposited on the sliding bearing element blank used. In this way, for example, $Al_2O_3$ may be produced during reactive sputtering of aluminum in an oxygen plasma. If the reaction takes place at the target, the reaction product is sputtered.

For reactive sputtering of the layers, the parameters mentioned above may be applied.

In addition to the deposition methods mentioned, however, other suitable deposition methods may also be used, at least for individual ones of the layers, for example wet chemical deposition methods (e.g. galvanic methods), or deposition by means of electron beam vapor deposition methods. In addition, there is the possibility of mask vapor deposition or mask sputtering.

According to one embodiment of the method, the structuring of the sensor layer 6 is carried out by means of energy radiation, preferably with a laser and/or using at least one mask. In particular, the laser used for this purpose is an ultrashort pulse laser, preferably a so-called femtosecond laser. The advantage here is the exact and residue-free ablation of very small amounts of material without significant influence on the substrate by heat transfer.

The following parameters may be applied for structuring the sensor layer 6 using a laser:
Pulse durations: ps-/fs-range
Pulse energy: 1 µJ to 100 µJ
Pulse repetition frequencies 1 kHz- to 800 MHz Wavelength in the 1 μm range, as commercially available.

Focusing approx. 10 μm to 100 μm (=processing resolution)

Preferably focused radiation, but imaging is also conceivable or working with beam shaping components If necessary, additional masks (e.g. made of metal) may be used with the laser to shade surface areas that cannot be removed from the influence of the laser.

However, the structuring of the sensor layer 6 may also be carried out by other methods, again using masks if necessary, for example by means of wet chemical etching methods or by dry etching methods, such as bombardment of the surface to be structured with argon ions or with plasma-activated gases.

According to one embodiment of the sliding bearing element 1, the measuring device 3 is arranged in the most heavily loaded zone of the sliding layer 4, i.e. in the radial direction above this zone. The most heavily loaded zone of the sliding layer 4 is the upper sliding bearing element 1 in the case of a connecting rod bearing and the lower sliding bearing element 1 in the case of a so-called main bearing.

For contacting the sensor layer 6 with further electrical or electronic components, it may be provided that the conductive paths 11 lead into the region of axial end faces 13 of the sliding bearing element 1 (i.e. the end faces 13, as viewed in the axial direction) and contact points are formed on these axial end faces 13, which may be electrically conductively connected to mating contact points.

Figure 3:
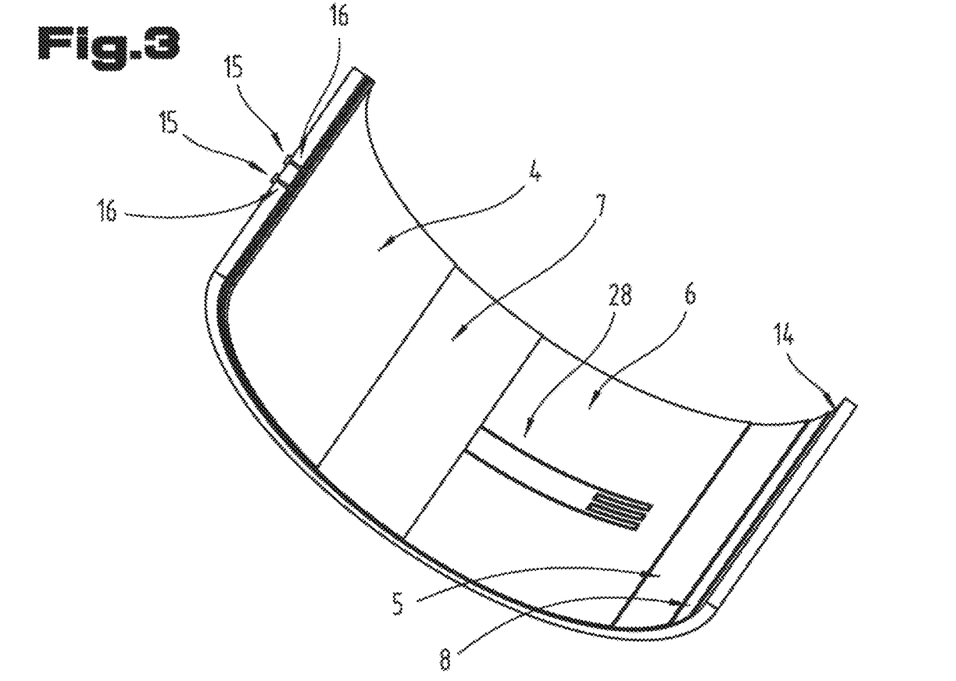
FIG. 3 an oblique view of a sliding bearing element with layers partially removed.

According to another embodiment variant of the sliding bearing element 1, it may also be provided that electrical contacts 15, which are electrically conductively connected to the sensor layer 6, as shown in FIG. 3, are arranged on a radially outermost layer of the sliding bearing element 1, for example a support layer 14. This FIG. 3 shows a sliding bearing element 1 with a radially outermost support layer 14, the bearing metal layer 8 arranged thereon, the first electrical insulating layer 5 arranged thereon, the sensor layer 6 arranged thereon, the second electrical insulating layer 7 arranged thereon and the sliding layer 4 arranged thereon, individual layers having been partially removed for better illustration of the layer structure.

In this embodiment, the radially outermost layer is the support layer 14 already mentioned in the description of FIG. 1. In a different layer structure, however, the radially outermost layer may also be formed by another layer.

For the connection of the sensor layer 6 to the electrical contacts, openings 16, in particular holes, may be provided through the layers of the sliding bearing element 1 arranged radially above the sensor layer 6, which are filled with an electrically conductive material, e.g. copper or the material of the sensor layer 6, or in which this material is arranged.

Figure 4:
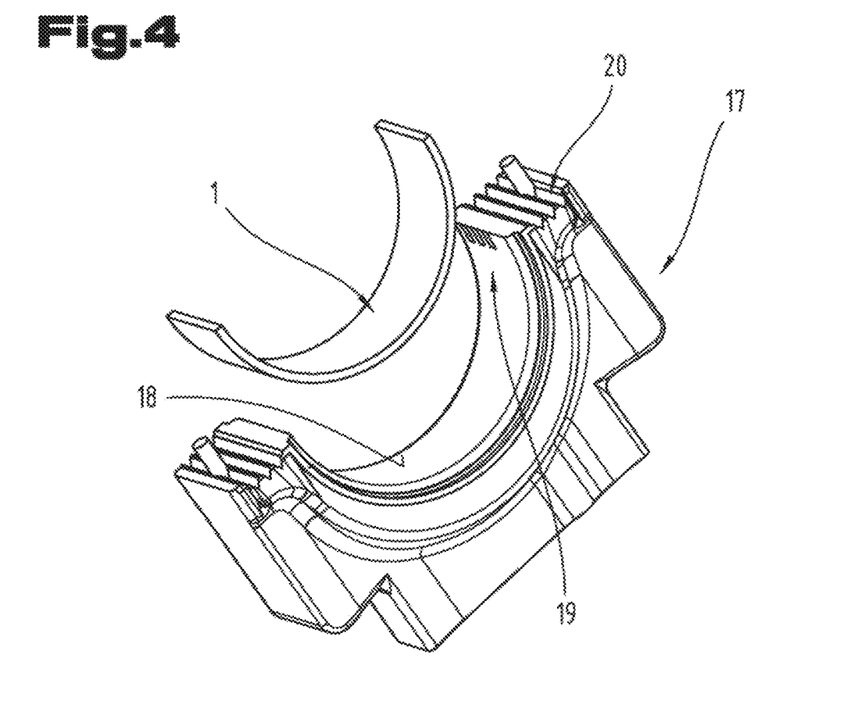
FIG. 4 an oblique view of a bearing receptacle.

According to a further embodiment of the sliding bearing, the mating points of these contacts 15 may be arranged on a bearing receptacle 17, as shown in FIG. 4. This figure shows a part of the sliding bearing, namely a bearing cover, which forms the bearing receptacle 17. The bearing cap may, for example, be part of a connecting rod. On a radially inner surface 18 of the bearing receptacle 17, the at least one sliding bearing element 1 is arranged in abutment (possibly with spreading), as is known per se. Electrical contacts 19 are arranged on this radially inner surface 18, to which on the one hand the contacts 15 of the sliding bearing element 1 (FIG. 3) abut and which on the other hand are electrically conductively connected to further electrical or electronic components.

The electrical contacts 19 on the bearing receptacle 17 are generally positioned in such a way that the electrical contacts 15 of the sliding bearing element 1 are in contact with these electrical contacts 19 of the bearing receptacle due to its installation in the bearing receptacle 17. In the embodiment of the bearing receptacle 17 shown in FIG. 4, electrical contacts 19 are thus arranged adjacent to a separating surface 20 of the bearing cover so that they may be electrically conductively connected to the electrical contacts 15 of the sliding bearing element 1 as shown in FIG. 4.

Although it has been stated above that the electrical contacts 15 may be arranged in the region of the end face 12 (FIG. 2), they may generally be arranged on the bearing back, i.e. the outer lateral surface of the sliding bearing element 1. Accordingly, the electrical contacts 19 of the bearing receptacle 17 are positioned differently on the surface 18 of the bearing receptacle 17.

It should be mentioned at this point that in FIGS. 1 to 8 different embodiments of the sliding bearing element 1 are shown, whereby the same reference signs or component designations are used for the same parts. In order to avoid unnecessary repetitions, reference is made to the detailed description of the respective (other) figure(s) or reference is made thereto.

Figure 5:
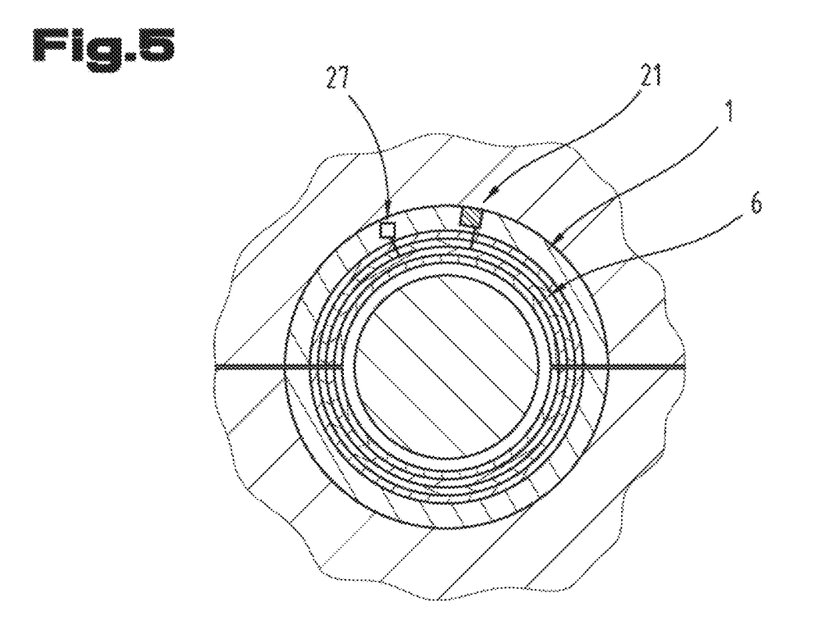
FIG. 5 a section of a sliding bearing.
Figure 6:
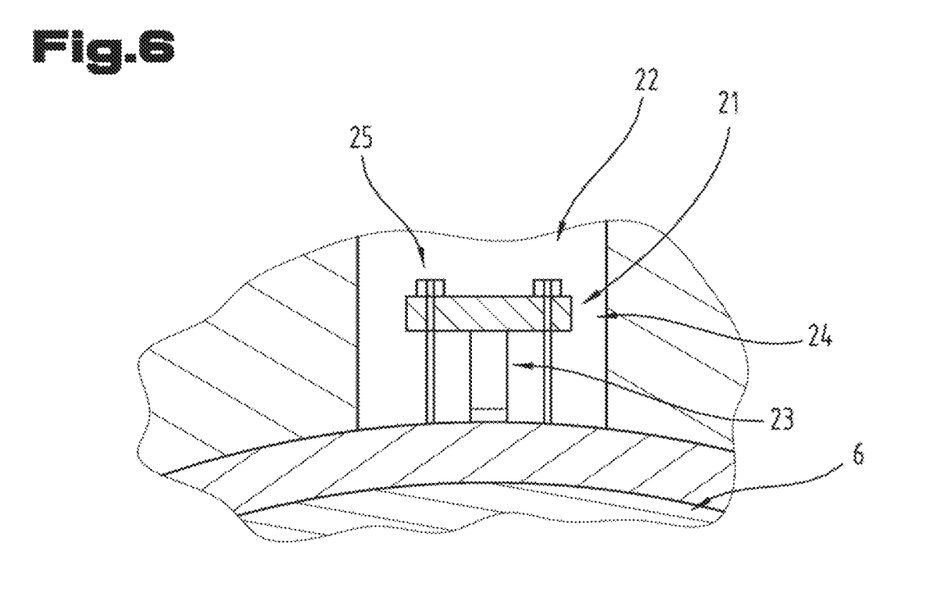
FIG. 6 a detail from the section of the sliding bearing shown in FIG. 5.

According to another embodiment of the sliding bearing element 1, which is shown in FIGS. 5 and 6, it may be provided that the sensor layer 6 is connected to an energy generating device 21. With the aid of this energy generating device 21, it is possible to supply the at least one sensor, i.e. the sensor layer 21, with electrical energy in a self-sufficient manner, so that no wired connections of the sliding bearing element 1 to the outside are required for this purpose.

The at least one energy generating device 21 (more than one energy generating device 21 may also be arranged) is arranged in or on the at least one sliding bearing element 1 in the illustrated embodiment of the sliding bearing, for example in a recess 22 in the sliding bearing element 1, as may be seen from FIG. 6, which shows a detail of the sliding bearing according to FIG. 5. It should be noted, however, that this specifically illustrated arrangement of the energy generating device 21 is not of any limiting character, but merely serves to explain the invention. Constructively, the arrangement may also be achieved differently.

The power generating device 21 has at least one piezo element 23, which is shown in FIG. 6. Depending on the amount of energy required, more than one piezo element 23 may also be arranged in the sliding bearing arrangement 1 for generating electrical energy, for example in the form of a piezo element package.

The at least one piezo element 23 may also be a multilayer stack, i.e., a multilayer piezo element 23 with multiple piezo elements arranged on top of each other.

The piezo element 23 may have any cross-sectional shape, such as a circular shape or a rectangular shape, such as a square shape.

This piezo element 23 may be arranged biased to pressure. For this purpose, a pressure beam 24 may be arranged resting on the piezo element 23, as shown in FIG. 6. The pressure beam 24 may be fastened via two screws 25.

Figure 7:
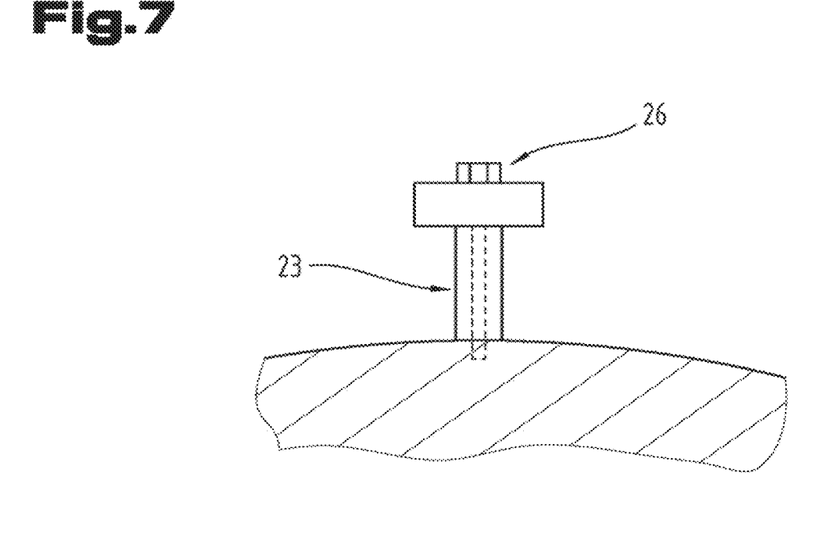
FIG. 7 a detail of another embodiment of the sliding bearing arrangement.

Alternatively, as shown in FIG. 7, an adjusting screw 26 may be arranged above the piezo element 23, the adjustment of which may be used to change the pressure acting on the piezo element 23.

In principle, the at least one piezo element 23 may also be otherwise biased to pressure, for example by means of a spring element, etc.

Preferably, the at least one piezo element 23 is not twisted by the bias, i.e., the two end faces (upper and lower end faces) of the piezo element 23 are not twisted relative to each other along the longitudinal central axis through the piezo element 23 by the bias.

In the described arrangement of the bias, the piezo element 23 is arranged free-standing on or in the sliding bearing element 1, as may be seen in FIG. 6. However, it is also possible for the piezo element 23 to be arranged in a recess which corresponds to that of the piezo element 23 in terms of size and shape of the cross-section, so that the latter may be pushed into the recess and may also be supported or guided laterally in this recess.

For the sake of completeness, it should be noted that the operating principle of a piezo element is not described here, as this is described in detail in the literature and is also known to the person skilled in the art.

The at least one piezo element 8 may be biased under a pressure selected from a range of 5 MPa to 50 MPa, in particular from 5 MPa to 30 MPa.

The at least one piezo element 23 may be made of lead zirconate titanate (PZT) or barium titanate, for example. However, other piezo materials may also be used.

The energy generating device 21 may also be formed by other elements, such as an inductive energy supplying device 21 or an energy generating device 21 that uses the Seebeck effect.

According to another embodiment of the sliding bearing element 1, it is further possible that the sensor layer 6 is connected to a data transmission device 27, which is arranged in or on the sliding bearing element 1, as this is also shown schematically in FIG. 5. Preferably, the data transmission device 27 is designed for wireless data transmission, for example via Bluetooth and/or Zygbee and/or WLAN and/or LoWPAN and/or ZigBee and/or ANT/ANT, etc. If necessary, the data transmission device 27 may also be supplied with electrical power by the power generating device 21.

Preferably, a four-wire measurement method is used, for example in the form of a Wheatstone bridge. However, another method may also be used, e.g. a constant current method.

According to a further embodiment, in order to be able to compensate for temperature influences on the measurement that are not related to the measurement result per se, it is possible for the sensor layer 6 to have an additional conductor loop 28 for temperature compensation during the measurement, as may be seen in FIG. 3.

Figure 9:
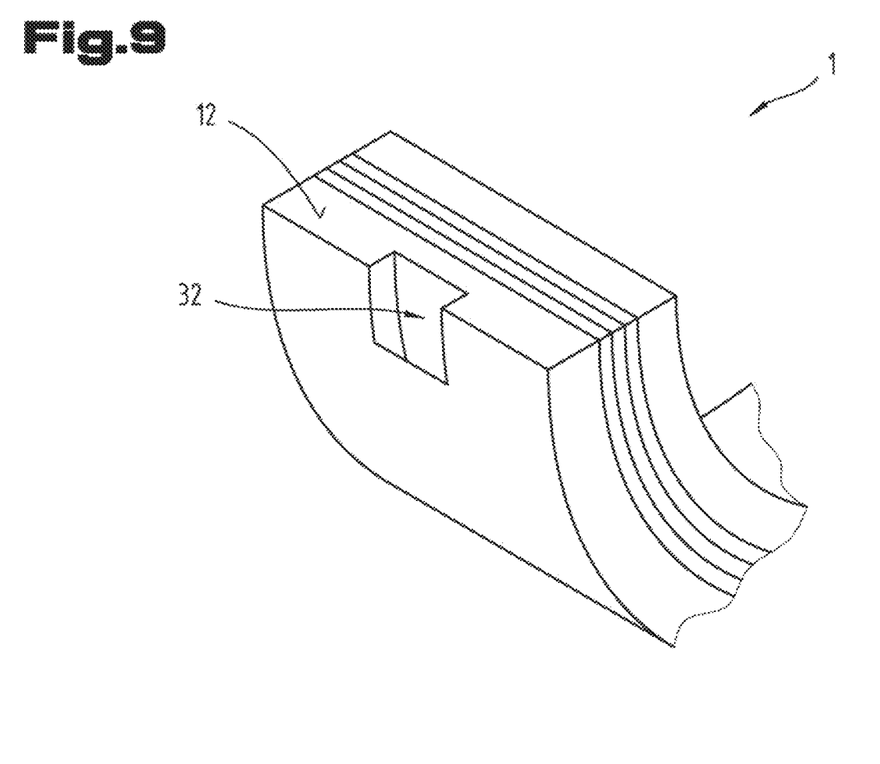
FIG. 9 a section of a sliding bearing element.

FIG. 9 shows an embodiment of a sliding bearing in the form of a connecting rod. This connecting rod has a connecting rod shank 29 which forms part of the large connecting rod eye and thus part of the bearing receptacle 17. On and/or at least partially in the connecting rod shank and/or on and/or at least partially in the bearing receptacle 17, a telemetry device or components thereof may be arranged, such as the data transmission device 27, the power generating device 21, a microprocessor 30, an analog-to-digital converter 31, etc.

Figure 8:
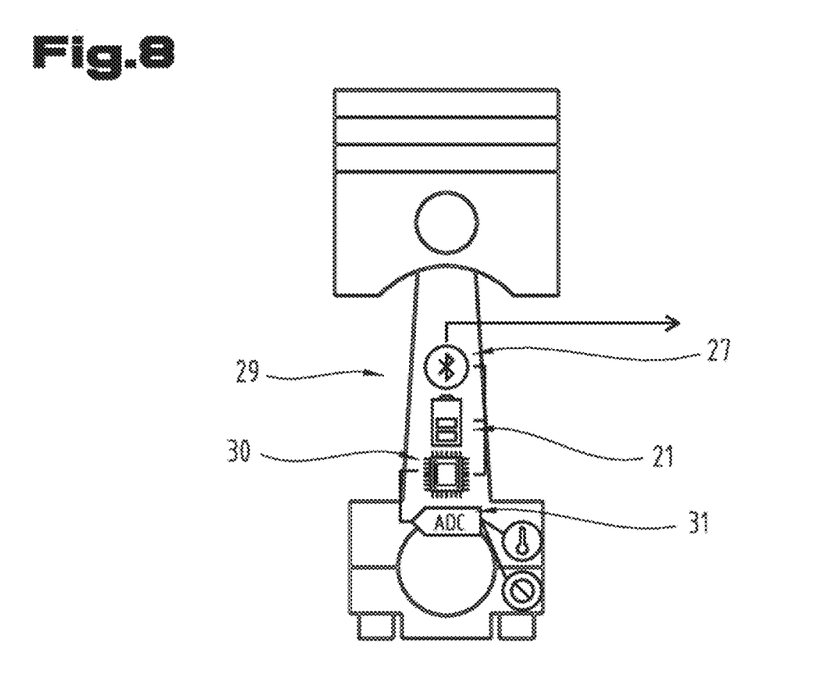
FIG. 8 a connecting rod.

However, it is also possible that according to another embodiment of the sliding bearing element 1, it is provided that at least one recess 32 is formed on the radial end face 12 of the sliding bearing element 1, which extends from there into the bearing back, as may be seen in FIG. 9. In this recess 32, at least a part of the telemetry device may be arranged, such as for example the microprocessor 30 (FIG. 8).

The embodiment examples show possible embodiment variants, whereby it should be noted at this point that various combinations of the individual embodiment variants with one another are also possible.

Finally, for the sake of order, it should be noted that for a better understanding of the structure of the sliding bearing element 1 or the sliding bearing, these are not necessarily shown to scale.

The invention claimed is:

1. A sliding bearing element comprising:
a first layer having a radially inner surface,
a measuring device arranged on the radially inner surface of the first layer, the measuring device including, in the order indicated, a first electrical insulating layer arranged over the entire radially inner surface of the first layer and defining a radially inner surface, a sensor layer arranged over the entire radially inner surface of the first electrical insulating layer and defining a radially inner surface, the sensor layer having a thickness between 0.1 µm and 4 µm and structured to form conductive paths, and a second electrical insulating layer arranged over the entire radially inner surface of the sensor layer and defining a radially inner surface, and
a sliding layer arranged over the entire radially inner surface of the second electrical insulating layer, wherein:
the first electrical insulating layer is a PVD layer deposited directly onto the first layer,
the sensor layer is a PVD layer,
the second electrical insulating layer is a PVD layer, and
the sliding layer is a PVD layer or an anti-friction varnish layer.

2. The sliding bearing element according to claim 1, wherein the sliding layer is a sputtering layer.

3. The sliding bearing element according to claim 1, wherein a running-in layer is arranged on the sliding layer.

4. The sliding bearing element according to claim 1, wherein at least one of the first and the second insulating layers is formed by $Al_2O_3$ and/or $SiO_2$.

5. The sliding bearing element according to claim 1, wherein at least one of the first and the second insulating layers has a layer thickness between 2 µm and 8 µm.

6. The sliding bearing element according to claim 1, wherein the sensor layer is formed by chromium or a chromium-nickel alloy.

7. The sliding bearing element according to claim 1, wherein electrical contacts are arranged on a radially outermost layer and are electrically conductively connected to the sensor layer.

8. The sliding bearing element according to claim 1, wherein the sensor layer is connected to a data transmission device, the data transmission device being designed for wireless data transmission.

9. The sliding bearing element according to claim 1, wherein the sensor layer is connected to an energy generating device.

10. The sliding bearing element according to claim 1, wherein the sensor layer has a conductor loop for temperature compensation during measurement.

11. A sliding bearing element according to claim 1, wherein, on a radial end face, a recess is formed in which a telemetry device is arranged.

12. A sliding bearing comprising a bearing receptacle having a radially inner surface, and at least one sliding bearing element formed according to claim 1, the at least one sliding bearing element is arranged to abut the radially inner surface of the bearing receptacle.

13. The sliding bearing according to claim 12, wherein the at least one sliding bearing element according to claim 1 is arranged so that its sensor layer is positioned at least in the most heavily loaded zone of the sliding bearing.

14. The sliding bearing according to claim 12, wherein electrical contacts are arranged on the radially inner surface of the bearing receptacle.

15. The sliding bearing according to claim 12, wherein a telemetry device is arranged on or at least partially in the bearing receptacle.

16. A method of manufacturing a sliding bearing element, according to which a measuring device is formed on a radially inner surface of a first layer, the method comprising:
  depositing a first electrical layer directly onto the entire radially inner surface of the first layer using a PVD method so as to define a radially inner surface,
  depositing a sensor layer over the entire radially inner surface of the first electrical insulating layer using a PVD method so as to define a radially inner surface, the sensor layer having a thickness between 0.1 µm and 4 µm and being structured to form conductive paths,
  depositing a second electrical insulating layer over the entire radially inner surface of the sensor layer using a PVD method so as to define a radially inner surface, and
  arranging a sliding layer over the entire radially inner surface of the second electrical insulating layer over the entire radially inner surface, wherein:
  the sliding layer is deposited using a PVD method or is formed as an anti-friction varnish layer.

17. The method according to claim 16, further comprising:
  structuring the sensor layer to form the conductive paths after the sensor layer is deposited over the first electrical insulating layer.

18. The method according to claim 17, wherein the structuring of the sensor layer is carried out with a laser and/or using at least one mask.

19. The method according to claim 16, wherein at least one of the first electrical insulating layer, the sensor layer, and the second electrical insulating layer is produced by means of reactive sputtering.

* * * * *